US012584510B2

(12) United States Patent
Dossmann

(10) Patent No.: US 12,584,510 B2
(45) Date of Patent: Mar. 24, 2026

(54) TORQUE-LIMITING NUT FOR A BREAK-OFF BOLT

(71) Applicant: Tyco Electronics Simel, Gevrey Chambertin (FR)

(72) Inventor: Julien Dossmann, Gevrey-Chambertin (FR)

(73) Assignee: TYCO ELECTRONICS SIMEL, Gevrey-Chambertin (FR)

( * ) Notice: Subject to any disclaimer, the term of this patent is extended or adjusted under 35 U.S.C. 154(b) by 338 days.

(21) Appl. No.: 17/690,785

(22) Filed: Mar. 9, 2022

(65) Prior Publication Data

US 2022/0196062 A1 Jun. 23, 2022

Related U.S. Application Data

(63) Continuation of application No. PCT/EP2020/074990, filed on Sep. 8, 2020.

(30) Foreign Application Priority Data

Sep. 10, 2019 (EP) .................................... 19306089

(51) Int. Cl.
*F16B 31/02* (2006.01)
(52) U.S. Cl.
CPC .................................. *F16B 31/021* (2013.01)
(58) Field of Classification Search
CPC .. F16B 31/021; F16B 2200/93; F16B 31/025; F16B 31/028; F16B 33/02; F16B 37/14; H01R 4/36

USPC ......... 411/1, 2, 372.5, 372.6, 373, 374, 427, 411/429, 431, 432
See application file for complete search history.

(56) References Cited

U.S. PATENT DOCUMENTS

| | | | | |
|---|---|---|---|---|
| 1,696,523 | A | * 12/1928 | Cochran | ............... F16B 41/005 |
| | | | | 411/925 |
| 3,311,147 | A | * 3/1967 | Walker | .................... F16B 33/02 |
| | | | | 411/278 |
| 5,064,326 | A | * 11/1991 | Davis | .................... G09F 3/0317 |
| | | | | 411/374 |
| 5,228,250 | A | 7/1993 | Kesselman | |
| 6,280,264 | B1 | * 8/2001 | Whipple | ............ H01H 11/0031 |
| | | | | 439/814 |

(Continued)

FOREIGN PATENT DOCUMENTS

| | | |
|---|---|---|
| AU | 2011202893 B1 | 8/2011 |
| CN | 102637966 A | 8/2012 |

(Continued)

OTHER PUBLICATIONS

PCT Notification, International Search Report, dated Nov. 5, 2020, and Written Opinion, Intl App No. PCT/EP2020/074990, 17 pages.

(Continued)

*Primary Examiner* — Kristina R Fulton
*Assistant Examiner* — Jock Wong

(57) ABSTRACT

A torque-limiting nut for a break-off bolt includes a thread section having an internal thread, a head section having an abutment shoulder extending further toward a radial inward direction than the internal thread, and a predetermined breaking area separating the thread section and the head section. The abutment shoulder is arranged adjoining to the predetermined breaking area.

14 Claims, 5 Drawing Sheets

(56)                References Cited

U.S. PATENT DOCUMENTS

| | | | | |
|---|---|---|---|---|
| 6,321,624 | B1 * | 11/2001 | Croton | H01R 4/307 |
| | | | | 81/437 |
| 8,425,265 | B2 | 4/2013 | Stauch et al. | |
| 8,662,805 | B2 * | 3/2014 | Schaeffer et al. | |
| 2008/0025815 | A1 * | 1/2008 | Lubchansky | F16B 23/0007 |
| | | | | 411/372.5 |
| 2008/0254667 | A1 * | 10/2008 | Barnett | H01R 4/5025 |
| | | | | 439/321 |
| 2012/0021634 | A1 * | 1/2012 | Stauch | H01R 4/307 |
| | | | | 439/359 |
| 2012/0202393 | A1 * | 8/2012 | Stauch | H01R 4/363 |
| | | | | 439/814 |
| 2014/0033494 | A1 * | 2/2014 | O'Sullivan | F16B 31/00 |
| | | | | 411/5 |
| 2014/0241826 | A1 * | 8/2014 | Caponera | F16B 35/042 |
| | | | | 470/8 |
| 2015/0226248 | A1 | 8/2015 | Robertson, Jr. | |
| 2016/0322715 | A1 * | 11/2016 | Beiler | H01R 4/366 |
| 2017/0244179 | A1 * | 8/2017 | Jaroschek | H01R 4/36 |
| 2019/0165498 | A1 * | 5/2019 | Saeed | F16B 31/021 |

FOREIGN PATENT DOCUMENTS

| | | | | | |
|---|---|---|---|---|---|
| CN | 110145531 | A | * | 8/2019 | F16B 37/14 |
| CS | 244091 | A3 | * | 4/1992 | |
| DE | 2353751 | A1 | * | 5/1975 | |
| DE | 3635605 | A1 | * | 4/1988 | |
| DE | 4024042 | C1 | * | 10/1991 | |
| DE | 202004002359 | U1 | * | 7/2004 | F16B 31/021 |
| DE | 10 2011 003 835 | A1 | | 8/2012 | |
| DE | 102015102223 | A1 | * | 8/2016 | |
| EP | 239428 | A | * | 9/1987 | H01R 4/2408 |
| EP | 1833117 | A2 | * | 9/2007 | F16B 31/021 |
| EP | 2375502 | A1 | * | 10/2011 | H01R 4/36 |
| EP | 2498338 | A1 | * | 9/2012 | F16B 31/021 |
| EP | 3388696 | A | | 10/2018 | |
| ES | 2125180 | B1 | * | 12/1999 | H01R 4/36 |
| ES | 2401633 | A1 | * | 4/2013 | H01R 4/36 |
| FR | 2787153 | A1 | * | 6/2000 | F16B 37/14 |
| FR | 2842878 | A1 | * | 1/2004 | F16B 37/14 |
| GB | 854792 | | | 11/1960 | |
| GB | 2406626 | A | | 4/2005 | |
| WO | 2014000881 | A1 | | 1/2014 | |
| WO | WO-2017020286 | A1 | * | 2/2017 | |

OTHER PUBLICATIONS

Extended European Search Report, App No. 19306089.4-1010, dated Feb. 20, 2020, 10 pages.

* cited by examiner

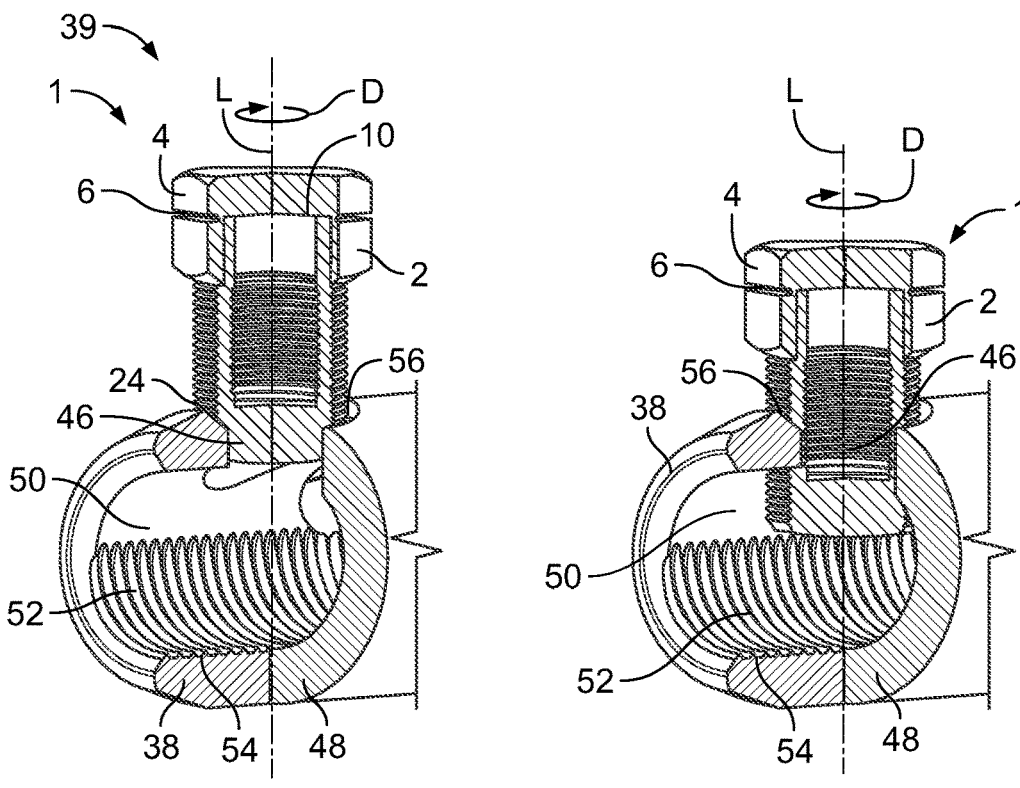
Fig. 5                    Fig. 6
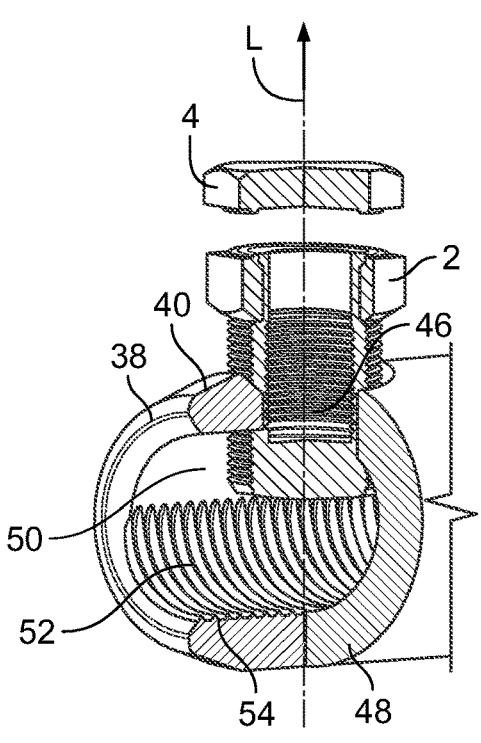
Fig. 7

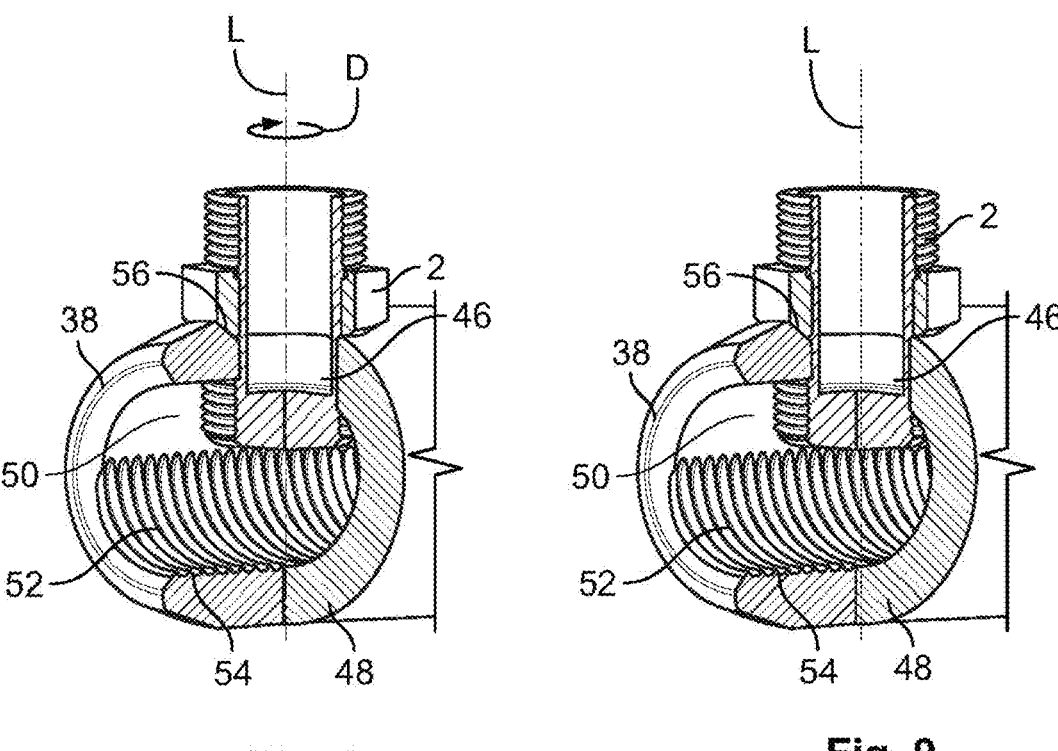
Fig. 8
Fig. 9
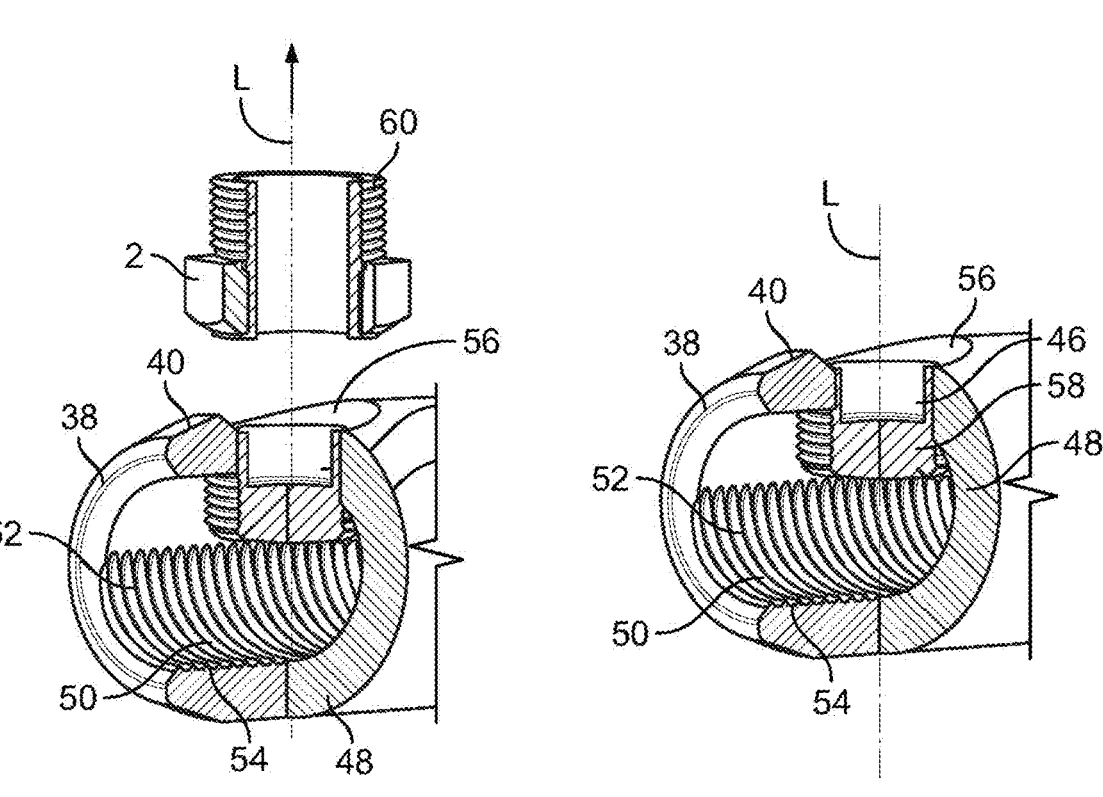
Fig. 10
Fig. 11

TORQUE-LIMITING NUT FOR A BREAK-OFF BOLT

CROSS-REFERENCE TO RELATED APPLICATIONS

This application is a continuation of PCT International Application No. PCT/EP2020/074990, filed on Sep. 8, 2020, which claims priority under 35 U.S.C. § 119 to European Patent Application No. 19306089.4, filed on Sep. 10, 2019.

FIELD OF THE INVENTION

The present invention relates to a bolt and, more particularly, to a torque-limiting break-off bolt.

BACKGROUND

Break-off bolts are often used for securing a conductor, such as a wire or cable within a connector or connecting two electrical conductors with one another, for example in medium or high-voltage technology. Break-off bolts are formed in such a way that excess length of the break-off bolts may be broken off, particularly due to tensile stress or a combination of tensile stress and shearing. Consequently, the bolt does not protrude beyond an outer surface of the connector after the installation.

For achieving and maintaining an electrically well conducting contact, the break-off bolt needs to be screwed into the connector with a predetermined torque. The predetermined torque may be ensured by using a so-called torque wrench. However, torque wrenches are quite specific tools which are often not available on an installation site.

SUMMARY

A torque-limiting nut for a break-off bolt includes a thread section having an internal thread, a head section having an abutment shoulder extending further toward a radial inward direction than the internal thread, and a predetermined breaking area separating the thread section and the head section. The abutment shoulder is arranged adjoining to the predetermined breaking area.

BRIEF DESCRIPTION OF THE DRAWINGS

The invention will now be described by way of example with reference to the accompanying Figures, of which:

FIG. 5 is a sectional perspective view of the break-off assembly during a first step of installation;

FIG. 6 is a sectional perspective view of the break-off assembly during a second step of installation;

FIG. 7 is a sectional perspective view of the break-off assembly during a third step of installation;

FIG. 8 is a sectional perspective view of the break-off assembly during a fourth step of installation;

FIG. 9 is a sectional perspective view of the break-off assembly during a fifth step of installation;

FIG. 10 is a sectional perspective view of the break-off assembly during a sixth step of installation;

FIG. 11 is a sectional perspective view of the break-off assembly during a seventh step of installation;

DETAILED DESCRIPTION OF THE EMBODIMENT(S)

Figure 1:
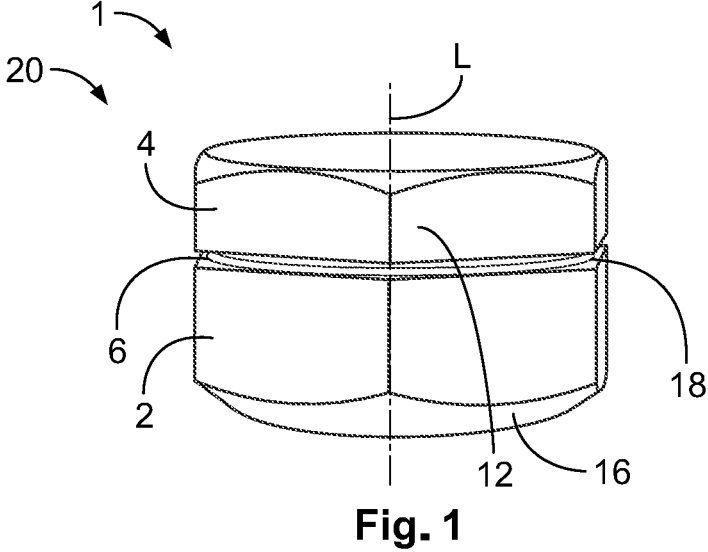
FIG. 1 is a perspective view of a torque-limiting nut according to an embodiment.

In the following, the torque-limiting nut and the break-off assembly according to the invention are explained in greater detail with reference to the accompanying drawings, in which exemplary embodiments are shown. In the figures, the same reference numerals are used for elements which correspond to one another in terms of their function and/or structure.

According to the description of the various aspects and embodiments, elements shown in the drawings can be omitted if the technical effects of those elements are not needed for a particular application, and vice versa: i.e., elements that are not shown or described with reference to the figures can be added if the technical effect of those particular elements is advantageous in a specific application.

In the following, the shorter words "bolt" and "nut" may be used instead of the word "break-off bolt" and "torque-limiting nut", respectively.

First, a first exemplary embodiment of a torque-limiting nut 1 according to the invention is described with reference to FIGS. 1 and 2.

Figure 2:
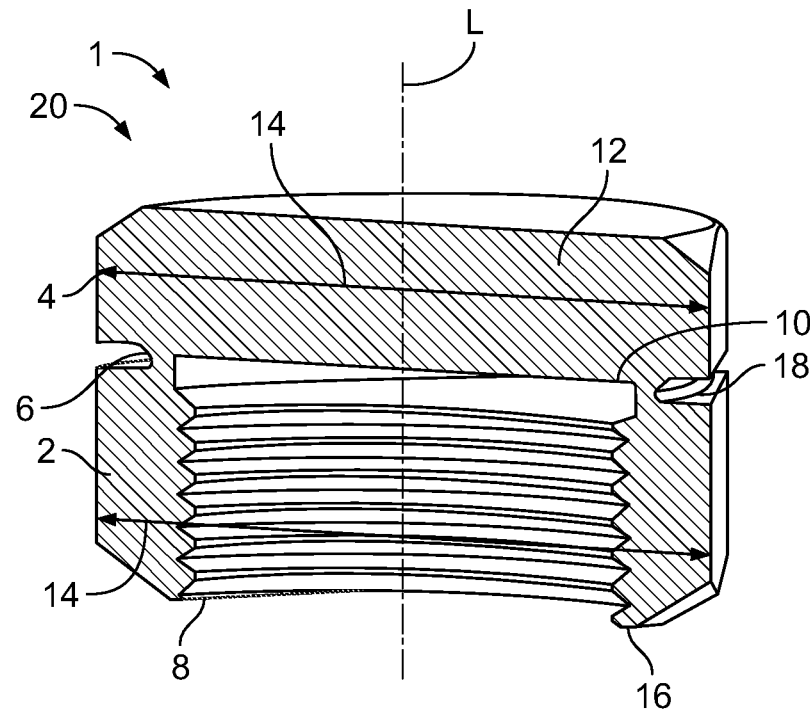
FIG. 2 is a sectional perspective view of the torque-limiting nut of FIG. 1.

The nut 1 comprises a thread section 2 and a head section 4, which are separated by a predetermined breaking area 6 along a longitudinal axis L of the nut 1, as shown in FIGS. 1 and 2. The thread section 2 may be adapted for being screwed onto a break-off bolt and thus comprises an internal thread 8. The head section 4 comprises at least one abutment shoulder 10 extending further towards the radial inward direction than the internal thread 8, the at least one abutment shoulder 10 being arranged adjoining to the predetermined breaking area 6. Therefore, a front face of the break-off bolt may abut the at least one abutment shoulder 10 of the head section 4, resulting in a blockage of rotational movement of the nut 1 relative to the break-off bolt in a winding direction for screwing the nut 1, particularly the thread section 2 further down the bolt along the longitudinal axis L.

The head section 4 may be solid, increasing the stability of the head section 4. Tampering with the head section 4, particularly the at least one abutment shoulder 10, may be prevented. The head section 4 may thus form a cap 12 of the nut 1.

The head section 4 may comprise a screw drive, so that the head section 4 may be engaged by a tool, such as a wrench. In this exemplary embodiment, the head section 4 comprises the shape of a hexagon with a width 14 or outer diameter shown in FIG. 2. In an embodiment, the head section 4 and the thread section 2 have a same outer shape with the same width 14 or outer diameter, so that neither constricts the other from being engaged by a tool and/or may be engaged simultaneously by the same tool.

In an embodiment, the head section 4, and the thread section 2 may comprise a structurally identical outer shape, so that the head section 4 and the thread section 2 may be engaged simultaneously by the same tool. For example, the outer circumference of the head section 4 and thread section 2 may comprise a polygonal form such as a hexagon, as in the shown embodiment, which can be engaged by a standardized hex-wrench. However, the thread section 2 may be adapted to be singly engaged by the standardized tool, so that after breaking at the predetermined breaking area 6, the thread section 2 can be directly screwed down the break-off bolt 24 without having to remove the head section 4 and/or having to disengage the torque-limiting nut 1 with the tool before engaging only the broken off thread section 2.

However, the head section 4 may also comprise a different outer shape than the thread section 2. For example, the head section 4 may be formed as a cap 12 that is adapted to be mounted onto a remaining part of the bolt after breaking. The cap 12 may be adapted to be inserted into a depression of the connector, so that the cap 12 does not protrude beyond an outer circumference of the connector. In an embodiment, the cap 12 may be adapted to be flush with an outer surface of the connector.

The head section 4 may not comprise a cavity and/or an internal thread, as in the embodiment shown in FIGS. 1 and 2, so that the head section 4 may easily be removed from the bolt after the nut 1 is broken at the predetermined breaking area 6. The head section 4 does not receive a part of the bolt and may thus simply fall off the bolt or be picked up without having to unwind the head section 4. A removal tool, such as a wrench for unscrewing the head section 4 from the break-off bolt 24, is not required.

The thread section 2 may extend along the longitudinal axis L from the predetermined breaking area 6 in a direction away from the head section 4 to a free end 16 of the nut 1. The thread section 2 may be hollow and the internal thread 8 may be arranged along the entire thread section 2. The free end 16 may abut the connector, and by having the thread 8 extending to the free end 16, it can be ensured that an external thread of the bolt is engaged by the internal thread 8 close to or at the interface between nut 1 and connector. Consequently, after shearing off of the bolt, it can be assured that the remaining part of the bolt does not protrude out of a bore of the connector beyond an outer surface of the connector.

In this exemplary embodiment, the thread section 2 may taper off towards the free end 16 along the longitudinal axis L for allowing a smooth sitting of the thread section 2 on the connector. The connector may comprise a depression, wherein the free end 16 of the thread section 2 may be complementary formed to the depression, allowing a tight seat of the thread section 2 at the interface between thread section 2 and connector.

The torque-limiting nut 1 may comprise a pedestal with a lower outer diameter than the remaining torque-limiting nut 1, particularly the thread section 2. The pedestal may extend from the thread section 2 at a distal end distant from the predetermined breaking area 6 along the longitudinal axis in a direction away from the predetermined breaking area 6. Therefore, the pedestal may be adapted to abut the connector, so that the thread section 2 may easily be engaged by an installation tool, such as a wrench, and is not blocked by the connector.

The thread section 2 may be adapted to be singly engaged by a standardized tool such as a wrench. Therefore, the thread section 2 may comprise the dimensions of a standardized nut, particularly the outer shape and dimensions of the standardized nut. By only engaging the thread section 2 with the installation tool, the thread section 2 may be continuously screwed onto the bolt before and after breaking of the nut 1 at the predetermined breaking area 6. Consequently, the installation efficiency may be increased, particularly for an automated installation. The removal of the head section 4 after breaking may be irrelevant for the installation of the bolt.

The head section 4 and the thread section 2 may be rigidly connected by the predetermined breaking area 6. The predetermined breaking area 6 may, for example, be formed by a constriction 18 on the outer surface of the nut 1. The outer shape may, in an embodiment, be circumferential at the predetermined breaking area 6, allowing for a clean cleavage between the head section 4 and the thread section 2 after the predetermined torque for installing the bolt is achieved.

The predetermined breaking area 6 may be hollow, wherein a material thickness of the predetermined breaking area 6 may be lower than the material thickness of the thread section 2, as shown in FIG. 2. In order to further ensure a simple removal of the head section 4 after the breakage of the nut 1 at the predetermined breaking area 6, the predetermined breaking area 6, in the shown embodiment, does not comprise an internal thread. Consequently, the external thread of the bolt at the predetermined breaking area 6 does not support the nut 1. The breaking at the predetermined breaking area 6 can be further smoothened by having one section gradually tapering towards the predetermined breaking area 6 and the other section transitioning abruptly to the predetermined breaking area 6. In this exemplary embodiment, the head section 4 tapers towards the predetermined breaking area 6, forming a smooth transition and the thread section 2 abruptly transitions into the predetermined breaking area 6 at around a 90° angle. This may further define the cleavage of the nut 1 after exceeding the predetermined torque, so that the material of the predetermined breaking area 6 can remain attached to the head section 4. However, depending on the application, one may also have an opposite arrangement, wherein the thread section 2 tapers towards the predetermined breaking area 6.

The thread section 2, head section 4, and predetermined breaking area 6 may, in an embodiment, be formed integrally with one another as a monolithic component 20, thereby simplifying the manufacturing process of the torque-limiting nut 1. In an embodiment, the torque-limiting nut 1 may be a steel nut, for example a stainless steel nut.

Figures 3, 4:
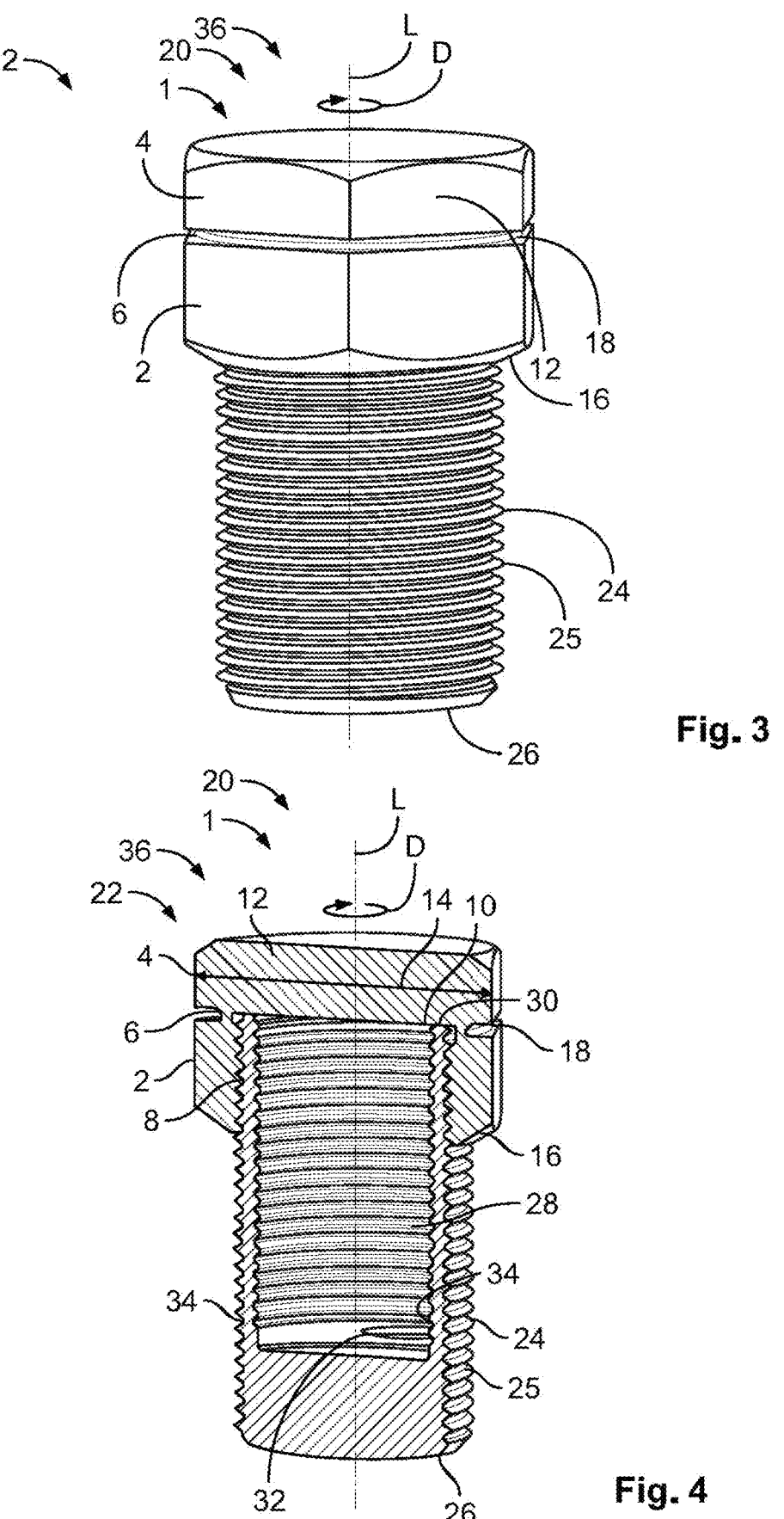
FIG. 3 is a perspective view of a break-off assembly according to an embodiment.
FIG. 4 is a sectional perspective view of the break-off assembly of FIG. 3.

In FIGS. 3 and 4, a break-off assembly 22 is shown. The break-off assembly 22 comprises a bolt 24 and the nut 1, which is described above with reference to FIGS. 1 and 2. The bolt 24 extends along the longitudinal axis L and comprises an external thread 25 along an entire length of the bolt 24. The bolt 24 may be composed of a sufficiently strong, in an embodiment well conducting material, such as aluminum or an aluminum alloy.

As can be seen in FIG. 3, the bolt 24 does not have an intended shearing section, as the distance of the place of shearing along the longitudinal axis L from a free end 26 of the bolt 24 may vary depending on the application. Therefore, the bolt 24 may be flexible and be used for different applications, such as electrically connecting a conductor within a connector with different conductor sizes.

FIG. 4 shows a cut view of the bolt 24 shown in FIG. 3. The bolt 24 may be hollow, comprising a cavity 28 that extends along the longitudinal axis L from the free end 26 of the bolt 24 towards a front face 30 arranged on an opposite end of the bolt 24 and opens towards the front face 30. Consequently, the bolt 24 may be thin-walled, reducing the shearing force necessary to break or shear the bolt 24.

The free end 26 of the bolt 24 may be solid in an embodiment, so that the free end 26 may be adapted to lie flat on the conductor, e.g. a wire or cable, pressing against the conductor with surface pressure. The surface pressure may be distributed along a larger contact area.

The cavity 28 may comprise an internal thread 32 having grooves 34 that further decrease the wall thickness of the bolt 24, as shown in FIG. 4, further reducing the torque needed for breaking, especially shearing, the bolt 24.

As depicted in the detailed view in FIG. 4, the internal thread 32 may be different to the external thread 25. For example, the internal thread 32 may have a counter helicoid compared to the external thread 25. In other words, the internal thread 32 and the external thread 25 may be staggered, so that the grooves 34 of the internal thread 32 may run parallel to the grooves 34 of the external thread 25, reducing the wall thickness of the bolt 24. The internal thread 32 may allow for a cleaner break at the top of the remaining bolt 24 after it has been broken by the nut 1, particularly the thread section 2, compared to a thin walled, hollow bolt 24 without an internal thread 32. The internal thread 32 reduces the occurrence of burs during breaking. The nut exerts a tensile stress on the bolt 24 causing the breakage of the bolt 24.

The internal thread 8 of the thread section 2 may be adapted to engage the external thread 25 of the bolt 24. The nut 1 can be screwed onto the bolt 24 until the front face 30 of the bolt 24 abuts the at least one abutment shoulder 10 of the head section 4 directly beyond the predetermined breaking area 6 with respect to the thread section 2. The head section 4 thus prevents the nut 1, particularly the thread section 2, from being screwed any further down the bolt 24 in a winding direction D for installing the bolt 24 in a connector. In the position shown in FIGS. 3 and 4, the nut 1 may serve as a screw head 36. As the break-off bolt 24 abuts the at least one abutments shoulder 10 directly next to the predetermined breaking area 6, the size of the torque-limiting feature, particularly the head section 4 along the longitudinal axis can be minimized, resulting in material savings during the manufacturing of the torque-limiting nut 1.

The function of the nut 1 is further explained with reference to FIGS. 5 to 11 showing different positions of the nut 1 during installation of the bolt 24 in a connector 38 forming a connector assembly 39. The connector 38 may be pipe-shaped and the conductor 52 may be a wire and/or cable extending parallel to the pipe shaped connector. The break-off assembly 22 may press the conductor 52 radially towards an inner surface of the pipe shaped connector.

FIG. 5 shows an intact bolt 24 in an initial position, in which the nut 1 is screwed onto the bolt 24 until the bolt 24 abuts the at least one abutment shoulder 10, blocking further movement of the nut 1 relative to the bolt 24 in the winding direction D and coupling the nut 1 and the bolt 24 in a rotationally rigid manner in the winding direction D. Therefore, the torque applied to the nut 1 is directly transferred to the bolt 24, screwing the bolt 24 into a bore 46 of the connector 38 (FIG. 6). In this position, the torque-limiting nut 1 may function as a screw head.

Once the predetermined torque, which in an embodiment is the required installation torque of the bolt 24, is surpassed, the nut 1 may break at the predetermined breaking area 6, separating the head section 4 and the thread section 2 from one another. Consequently, the thread section 2 may be rotationally decoupled from the bolt 24 and may travel down the bolt 24, as shown in FIGS. 7 and 8. The free end 26 of the bolt 24 presses against a conductor 52 that is arranged in a hollow space 50 of the connector 38, so that the conductor 52 is clamped between the bolt 24 and an inner surface 54 of the connector's wall 48.

The thread section 2 may travel down until abutment with an outer surface 40 of the connector 38, shown in FIGS. 8 and 9. The bore 46 may open into at least one depression 56 formed on the outer surface 40 of the connector 38. The depression 56 may be adapted to at least partially receive the thread section 2. Therefore, the free end 16 of the thread section 2 can evenly abut the connector 38 at the entrance of the bore 46, allowing for a clean cut of the bolt 24. By further inducing a torque on the thread section 2, the torque is transmitted to the bolt 24, subjecting the bolt 24 to tensile stress that leads to the breakage, especially shearing of the bolt 24 at the interface of the thread section 2 and the connector 38.

The bolt 24 may be split into a remaining part 58, arranged in the bore 46 and protruding into the hollow space 50 pressing against the conductor 52, and into a removable part 60 that can be discarded, as shown in FIGS. 10 and 11. The remaining part 58 of the bolt 24 establishes an electrical connection between the conductor 52 and the connector 38. The thread section 2 may be arranged on the removable part 60 and can also be discarded. The remaining part 58 may not protrude out of the bore 46 towards the outer surface 40 of the connector 38. For reducing the risk of pulling the remaining part 58 out of the bore 46 during shearing, the torque required to break, especially shear, the bolt 24 may be lower than the predetermined torque.

Therefore, with the nut 1, an easy and stable connection can be made. The installation can be completed in a single installation step, wherein a torque is applied to the thread section 2 until the bolt 24 is broken, while ensuring that the bolt 24 is installed with a predetermined torque without needing to use a specific tool, such as a torque wrench. During installation, no severed parts are required to be removed before the thread section 2 can be further screwed down the bolt 24, which may be the case by having different torque-limiting features. Consequently, the installation efficiency can be greatly enhanced and, for example, can easily be performed automatically.

Figure 12:
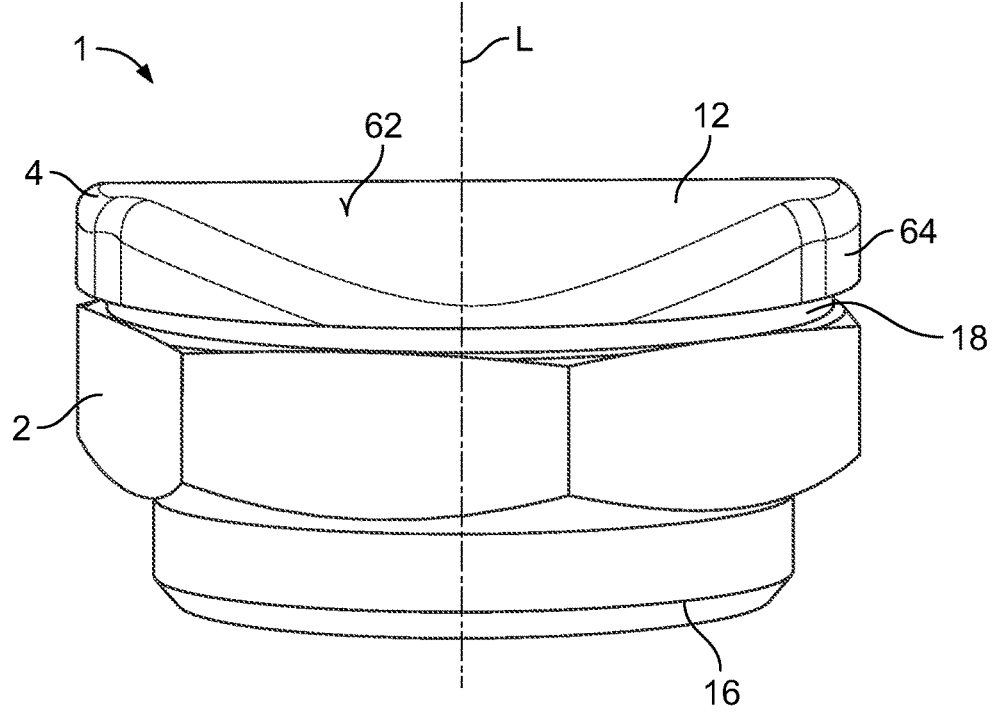
FIG. 12 is a perspective view of a torque-limiting nut according to another embodiment.

A further advantageous embodiment of the inventive nut 1 is shown in FIG. 12. In this embodiment, the head section 4 is formed having a curved surface 62 and may comprise at least one, in this case two guiding protrusions 64 protruding radially from the remaining head section 4. The two guiding protrusions 64 may be arranged diametrically to one another at the remaining head section 4. The remaining head section 4 may have a circumferential shape wherein the material thickness gradually increases from one side edge of the head section 4 towards the middle and similarly decreases from the middle towards the opposing side edge, creating the curved surface. The guiding protrusions 64 may be formed at a circumferential position of the remaining head section 4 with the maximal material thickness.

Figure 13:
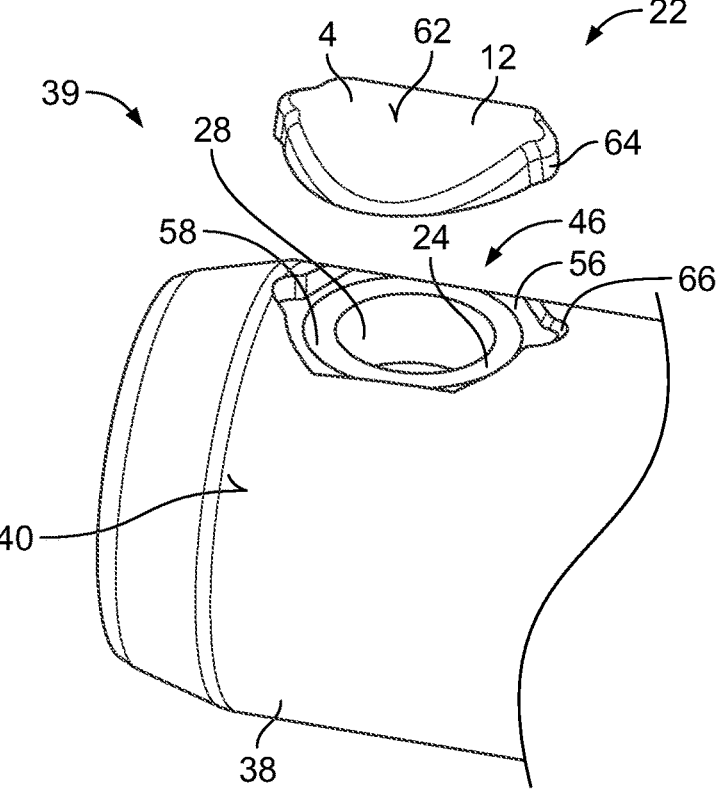
FIG. 13 is a perspective view of a connector assembly according to an embodiment.

After breakage of the head section 4 from the thread section 2, the head section 4 may be kept and used as a cap 12. The cap 12, shown in FIG. 13, may be inserted into the depression 56 of the connector 38 after breakage of the bolt 24. Thus, the cap 12 may close off the remaining part of the bolt 58. The depression 56 may comprise guiding notches 66 complementary to the guiding protrusions 64 of the head section 4. In an embodiment, the cap 12 may be fittingly received in the depression 56 so that the curved surface 62 is flush with the outer surface 40 of the connector 38. The curved surface 62 may complement or complete the outer surface 40 of the connector 38, so that the depression 56 is completely filled with the cap 12. The guiding protrusions 64 and the guiding notches 66 form a fixing mechanism. The cap 12 prevents dust or other particles from entering the cavity 28.

What is claimed is:

1. A break-off assembly for installing a conductor within a connector, comprising:

a break-off bolt; and a torque-limiting nut including a thread section having an internal thread, a head section having an abutment shoulder extending further toward a radial inward direction than the internal thread, and a predetermined breaking area separating the thread section and the head section, the abutment shoulder is arranged adjoining to the predetermined breaking area, the break-off bolt has a remaining part that remains in the connector after breakage by the torque-limiting nut, a cavity of the remaining part is configured to be covered and closed by the head section.

2. The break-off assembly of claim 1, wherein the abutment shoulder abuts a front face of the break-off bolt.

3. The break-off assembly of claim 2, wherein the break-off bolt has the cavity open towards the front face of the break-off bolt.

4. The break-off assembly of claim 1, wherein a first torque for breaking the torque-limiting nut at the predetermined breaking area is higher than a second torque for breaking the break-off bolt.

5. The break-off assembly of claim 1, wherein the break-off bolt does not have a breaking area.

6. The break-off assembly of claim 1, wherein the thread section tapers toward a free end of the torque-limiting nut.

7. The break-off assembly of claim 1, wherein the internal thread extends from the predetermined breaking area away from the head section to the free end of the torque-limiting nut.

8. The break-off assembly of claim 1, wherein the head section is solid.

9. The break-off assembly of claim 1, wherein the predetermined breaking area is hollow and has a lower material thickness than the thread section.

10. The break-off assembly of claim 1, wherein the head section does not have the internal thread.

11. The break-off assembly of claim 1, wherein the predetermined breaking area does not have the internal thread.

12. The break-off assembly of claim 1, wherein the head section has a fixing mechanism fixing the head section to the break-off bolt.

13. The break-off assembly of claim 1, wherein the head section, the predetermined breaking area, and the thread section are formed integrally with one another as a monolithic component.

14. A connector assembly, comprising:

a connector having a hollow space and a bore extending from an outer surface of the connector to the hollow space; and a break-off assembly including a break-off bolt and a torque-limiting nut, the torque-limiting nut including a thread section having an internal thread, a head section having an abutment shoulder extending further toward a radial inward direction than the internal thread, and a predetermined breaking area separating the thread section and the head section, the abutment shoulder is arranged adjoining to the predetermined breaking area, the bore and a cavity of the break-off bolt positioned in the bore are configured to be covered and closed off by the head section after breakage of the break-off bolt by the torque-limiting nut.

* * * * *